(12) United States Patent
Behera et al.

(10) Patent No.: US 12,744,758 B2
(45) Date of Patent: Sep. 22, 2026

(54) SYSTEM AND METHOD FOR VALIDATING ORIGIN INFORMATION OF A DATA ITEM

(71) Applicant: Bank of America Corporation, Charlotte, NC (US)

(72) Inventors: Abhijit Behera, Telangana (IN); Gowri Sundar Suriyanarayanan, Tamilnadu (IN); Maneesh Kumar Sethia, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 231 days.

(21) Appl. No.: 18/484,196

(22) Filed: Oct. 10, 2023

(65) Prior Publication Data

US 2025/0119404 A1 Apr. 10, 2025

(51) Int. Cl.
*H04L 9/40* (2022.01)
*H04L 45/00* (2022.01)

(52) U.S. Cl.
CPC ........ *H04L 63/0236* (2013.01); *H04L 45/566* (2013.01); *H04L 63/0876* (2013.01)

(58) Field of Classification Search
CPC ... H04L 9/3066; H04L 45/745; H04L 63/123; H04L 63/126; H04L 63/168; H04L 63/0807; H04L 63/1416; H04L 12/40; H04L 49/1523; H04L 63/12; H04L 69/22; H04L 49/3018; G06F 16/182; G06F 21/606; G06F 9/544; G06F 11/3006
See application file for complete search history.

(56) References Cited

U.S. PATENT DOCUMENTS

| | | | | |
|---|---|---|---|---|
| 6,671,739 | B1 * | 12/2003 | Reed | H04L 63/1416<br>370/392 |
| 7,620,815 | B2 | 11/2009 | Fontanella et al. | |
| 7,698,179 | B2 | 4/2010 | Leung et al. | |
| 8,161,172 | B2 | 4/2012 | Reisman | |
| 9,471,805 | B2 | 10/2016 | Fisher et al. | |
| 10,032,036 | B2 | 7/2018 | Khan et al. | |
| 10,044,686 | B2 | 8/2018 | Barnett et al. | |
| 10,341,341 | B2 | 7/2019 | Fairbanks et al. | |

(Continued)

OTHER PUBLICATIONS

Abhijit Behera, U.S. Appl. No. 18/484,145, filed Oct. 10, 2023, "System and method for implementing traceability to a data item."

*Primary Examiner* — Dustin Nguyen

(57) ABSTRACT

A system for validating the origin information of a data item accesses a data packet that indicates a request to transfer a data item. The data packet is appended with a first header and a second header. The first header comprises information about the sender of the data packet. The second header comprises information about a user device from which the data packet has originated. The system compares the information about the sender of the data packet with previously provided user information and determines that the user information corresponds to the information about the sender. The system communicates a request that indicates whether the information about the user device is valid and receives a message that indicates the information about the user device is valid. In response, the system communicates a message that comprises the data packet and instructions that, upon execution, cause the data packet to be transferred.

20 Claims, 4 Drawing Sheets

(56) References Cited

U.S. PATENT DOCUMENTS 10,387,695 B2 8/2019 Engels et al.
10,497,237 B2 12/2019 Joseph
11,004,029 B2 5/2021 Loken et al.
11,301,864 B2 4/2022 Salama et al.
11,308,035 B2 4/2022 Prahlad et al.
2004/0221163 A1* 11/2004 Jorgensen ............. H04L 9/3066 713/182
2007/0237144 A1* 10/2007 Adhikari ................. H04L 63/12 370/392
2008/0075079 A1* 3/2008 Smith ................... H04L 63/123 370/392
2009/0129393 A1* 5/2009 Okuno ................ H04L 49/1523 370/395.6
2011/0035813 A1 2/2011 Trantham
2011/0154052 A1 6/2011 Yang et al.
2011/0270943 A1* 11/2011 Frey ........................ G06F 9/544 709/212
2013/0061329 A1 3/2013 Cai et al.
2013/0121345 A1* 5/2013 Zhang ..................... H04L 69/22 370/465
2014/0245385 A1* 8/2014 Singhal ................. H04L 63/126 726/3
2014/0301396 A1* 10/2014 Hong .................... H04L 45/745 370/392
2014/0317757 A1 10/2014 Moon
2015/0188900 A1* 7/2015 Charbonneau ...... H04L 63/0807 726/7
2017/0180069 A1* 6/2017 Leng ....................... H04L 12/40
2019/0109713 A1* 4/2019 Clark .................... G06F 16/182
2020/0024258 A1 1/2020 Koplitz et al.
2020/0364817 A1 11/2020 Liu et al.
2021/0185020 A1 6/2021 Barnett et al.
2021/0201310 A1 7/2021 Moss-Pultz et al.
2021/0406387 A1* 12/2021 Batcher ................. G06F 21/606
2021/0409388 A1* 12/2021 Batcher ............... H04L 49/3018
2022/0129878 A1 4/2022 Fitzsimmons et al.
2022/0247750 A1* 8/2022 Kaidi .................. G06F 11/3006
2023/0247006 A1* 8/2023 Pemmaraju ........... H04L 63/168 726/11

* cited by examiner

SYSTEM AND METHOD FOR VALIDATING ORIGIN INFORMATION OF A DATA ITEM

TECHNICAL FIELD

The present disclosure relates generally to information security, and more specifically to a system and method for validating origin information of a data item.

BACKGROUND

People use devices to communicate different kinds of data items to other people. When transferring a data item, the data item is generally not accompanied by the origin information about the sender and a device from which the data item originated. In these circumstances, illicitly acquired data items may be circulated back into the system and falsely represented as valid.

SUMMARY

The disclosed system described in the present disclosure is particularly integrated into a practical application of increasing the safety and security in transferring and receiving data items through a network. In particular, the disclosed system implements an unconventional system and method to implement traceability to a data item by adding origin information associated with the data item to a data packet that encapsulates the data item. The discloses system is configured to use the origin information to validate the data item, for example, to determine whether the data item has originated from an authorized device and associated with an authorized user.

Furthermore, the disclosed system increases the accuracy in the verification process of the data item by adding confidence layers to the data item, where the confidence layers represent the validity of the origin information associated with the data item. Furthermore, the disclosed system may implement a zero-confidence layer at a validation server—meaning that the received information associated with the data item first needs to be verified before allowing the data item to be processed or transmitted to another device.

In the current data item communication implementations, only a hash value associated with a data block (where the data item is stored) is evaluated during the process of validation of the data item. Consequently, using the current implementations, if an unauthorized individual gains illicit access to the data item, they are able to manipulate the system by adding a legitimate hash value to the data block. This manipulation involves combining multiple unauthorizedly accessed data items and generating a new data item block with a valid hash value. Therefore, the new data item block may be circulated back into distributed blockchain databases that uphold legitimate data items. Thus, the illicitly altered data item inaccurately and erroneously registered as valid by the currently distributed blockchain databases.

The disclosed system is configured to provide a technical solution to this and other technical problems currently arising in the realm of data item communication technology and the data bocks in blockchain validation technology. In some embodiments, the disclosed system is configured to add headers to the data packet that encapsulates the data item via the user device. The headers include origin information associated with the data item, the user, and/or the user's device. The origin information may be used in the process of validating the data item and data packet. The origin information may include the parameters. If any information included in the origin information is determined to be invalid, the disclosed system determines that the data item is invalid.

In some embodiments, the disclosed system is further configured to add a validation signature to the data packet via a gateway server. For example, the gateway server may compare the origin information included in the headers with a list of expected parameters. If more than a threshold number of parameters does not correspond to the counterpart parameter in the list of expected parameters, it may be determined that the data packet is invalid. In other words, it may be determined that the data packet originated from an unauthorized device. Otherwise, it may be determined that the data packet is valid. If it is determined that the data packet is valid, the gateway server may append a header to the data packet, where the header indicates a confidence signature of the gateway server that the data packet is valid.

In some embodiments, the disclosed system is further configured to validate the user information and device information included in the headers, e.g., via a validation server. For example, the validation server may receive previously provided user information included in the user profile from an operation server and compare the received user information with the user information included in the headers. If it is determined that the previously provided user information (included in the user profile) corresponds to the user information (included in the header), it may be determined that the user information is valid.

In this manner, the disclosed system provides several practical applications, including providing a security measure for transferring data items, providing traceability to the data items, and increasing the accuracy in validating data items and their origins. Therefore, the disclosed system provides a more secure, accurate, and efficient technique for transmitting and validating data items by adding confidence layers as headers to the data packets along the network path of the data packet through the network. Thus, bad actors cannot pass invalid data items as valid by adding a valid hash value to a data item.

According, the system and method of the present disclosure saves valuable computer, memory, and networking resources that would otherwise be spent in processing and validating potentially invalid or unauthorized data items, which, ultimately enhances overall system efficiency and security. This efficiency is achieved by implementing a structured approach to data validation and secure communication, which, in turn, reduces unnecessary computational load and memory usage in the process of transmitting, processing, and validating data items. Additionally, the streamlined validation process minimizes the burden on the network, which, in turn, facilitates smoother and faster data transfer. Furthermore, these resource-saving measures contribute to a more efficient and secure data communication system.

Implementing Traceability to a Data Item

In some embodiments, a system for implementing traceability to a data item comprises a user device and a gateway device. The user device includes a first memory operably coupled to a first processor. The first memory is configured to store one or more parameters comprising an internet protocol (IP) address associated with the user device, an identification of an operating system (OS) associated with the user device, a timestamp of initiating a request to transfer a data item, a device identifier associated with the user device, or a user profile. The first processor is configured to receive the request to transfer the data item. The first processor is further configured to generate a data packet that comprises the request. The first processor is further configured to append one or more first headers to the data packet, wherein the one or more first headers comprise the one or more stored parameters. The gateway server is communicatively coupled to the user device. The gateway server comprises a second processor. The second processor is configured to receive the data packet appended with the one or more first headers. The second processor is further configured to compare each parameter from among the one or more parameters with a counterpart parameter from among the list of expected parameters. The second processor is further configured to determine that more than a threshold number of the one or more parameters correspond to counterpart parameters from among the list of expected parameters. In response to determining that more than the threshold number of the one or more parameters correspond to the counterpart parameters from among the list of expected parameters, the second processor is further configured to append a second header to the data packet, wherein the second header indicates that the data packet is verified. The second processor is further configured to communicate a request message. The request message comprises the data packet appended with the one or more first headers and the second header. The request message further comprises instructions that cause the data packet to be transferred.

Validating the Origin Information of a Data Item

In some embodiments, a system for validating the origin information of a data item comprises a memory and a processor. The memory is configured to store user information associated with a sender of a data item. The processor is operably coupled to the memory. The processor is configured to access a data packet that indicates a request to transfer the data item. The data packet is appended with at least a first header and a second header. The first header comprises information about the sender of the data packet. The second header comprises information about a user device from which the data packet originated. The processor is further configured to receive the user information that was previously provided by the sender of the data item. The processor is further configured to compare the user information with the information about the sender of the data packet. The processor is further configured to determine that the user information corresponds to the information about the sender of the data packet. The processor is further configured to communicate a first request message to a gateway server, wherein the first request message indicates whether the information about the user device is valid. The processor is further configured to receive a first response message from the gateway server, wherein the first request message indicates that the information about the user device is valid. In response to receiving the first response message and determining that the user information corresponds to the information about the sender of the data packet, the processor is further configured to communicate a second request message to an operation server. The second request message comprises the data packet. The second request message further comprises instructions that cause the data packet to be transferred.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to implement traceability to a data item and validate the origin information of the data item. Embodiments of the present disclosure and its advantages may be understood by referring to FIGS. 1 through 4. FIGS. 1 through 4 are used to describe systems and methods to implement traceability to a data item and validate the origin information of the data item, according to some embodiments.

System Overview

Figure 1:
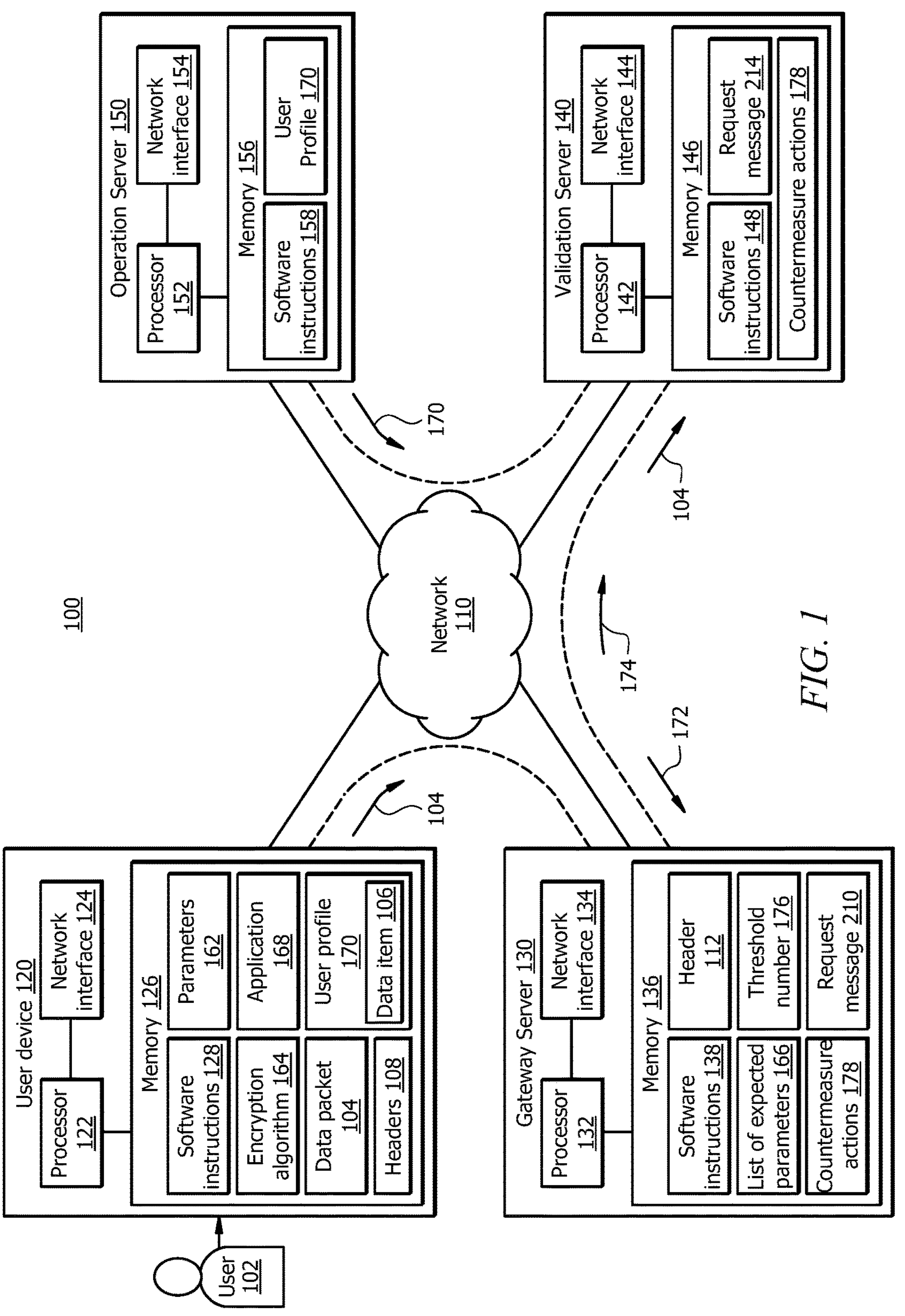
FIG. 1 illustrates an embodiment of a system configured to implement traceability to a data item and validate the origin information of the data item.

FIG. 1 illustrates an embodiment of a system 100 that is generally configured to increase the security in transferring and receiving data items 106 via a network 110, and in evaluating and executing data items 106. In the illustrated embodiment, the system 100 comprises a user device 120, a gateway server 130, a validation server 140, an operation server 150, communicatively coupled with one another via a network 110. Network 110 enables communications between components of the system 100. The user device 120 comprises a processor 122 in signal communication with a memory 126. The memory 126 stores software instructions 128 that when executed by the processor 122 cause the processor 122 to perform one or more operations of the user device 120. The gateway server 130 comprises a processor 132 in signal communication with a memory 136. The memory 136 stores software instructions 138 that when executed by the processor 132 cause the processor 132 to perform one or more operations of the gateway server 130. The validation server 140 comprises a processor 142 in signal communication with a memory 146. The memory 146 stores software instructions 148 that when executed by the processor 142 cause the processor 142 to perform one or more operations of the validation server 140. The operation server 150 comprises a processor 152 in signal communication with a memory 156. The memory 156 stores software instructions 158 that when executed by the processor 152 cause the processor 152 to perform one or more operations of the operation server 150. In other embodiments, system 100 may not have all of the components listed and/or may have other elements instead of, or in addition to, those listed above.

In general, the system 100 enhances the safety and security in transferring and receiving data items 106 via the network 110, increases the accuracy in evaluating data items 106, and increase the safety in executing data items 106. The system 100 improves the safety and security in transferring data items 106 via the network 110 by adding confidence layers to the data items 106, where the confidence layers represent the validity of origin information associated with the data item 106. The confidence layers may be verified by any component of the system 100.

Furthermore, the system 100 may implement a zero confidence layer at the validation server 140—meaning that the received information associated with the data item 106 first needs to be verified before allowing the data item 106 to be processed or transmitted to another device. Additionally, the system 100 improves the safety and security of transferring data items 106 via the network 110 by adding traceability to the data items 106 and appending origin information to the data packet 104 that encapsulates the data item 106. In some examples, the data item 106 may include a file, a document, cryptocurrency, and data object, among others.

In the current data item communication implementations, in the example where the data item 106 is a cryptocurrency, only a hash value associated with a block of cryptocurrency is evaluated during the process of determining whether the cryptocurrency is valid. Consequently, using the current implementations, if an unauthorized individual gains illicit access to cryptocurrency, they are able to manipulate the system by adding a legitimate hash value to the cryptocurrency block. This manipulation involves fusing multiple unauthorizedly accessed cryptocurrencies and generating a new cryptocurrency block with a valid hash value. Therefore, the new block of cryptocurrency may be circulated back into distributed blockchain databases that uphold legitimate cryptocurrency. Thus, the illicitly altered cryptocurrency is inaccurately and erroneously registered as valid by the current distributed blockchain databases.

The system 100 is configured to provide a technical solution to this and other technical problems currency arising in the realm of data item communication technology and cryptocurrency validation technology. In some embodiments, the system 100 is configured to add headers 108 to the data packet 104 that encapsulates the data item 106 via the user device 120. The headers 108 include origin information associated with the data item 106, the user 102, and/or the user device 120. The origin information may be used in the process of validating the data item 106 and data packet 104. The origin information may include the parameters 162. If any information included in the origin information is determined to be invalid, the system 100 determines that the data item 106 is invalid.

In some embodiments, the system 100 is further configured to add a validation signature to the data packet 104 via the gateway server 130. For example, the gateway server 130 may compare the origin information included in the headers 108 with a list of expected parameters 166. If more than a threshold number 176 of parameters 162 does not correspond to the counterpart parameter in the list of expected parameters 166, it may be determined that the data packet 104 is invalid. In other words, it may be determined that the data packet 104 has originated from an unauthorized device. Otherwise, it may be determined that the data packet 104 is valid. If it is determined that the data packet 104 is valid, the gateway server 130 may append a header 112 to the data packet 104, where the header 112 indicates a confidence signature of the gateway server 130 that the data packet 104 is valid.

In some embodiments, the system 100 is further configured to validate the user information and device information included in the headers 108, e.g., via the validation server 140. For example, the validation server 140 may receive previously provided user information included in the user profile 170 from the operation server 150 and compare the received user information with the user information included in the headers 108. If it is determined that the previously provided user information (included in the user profile 170) corresponds to the user information (included in the header 108), it may determined that the user information is valid.

In another example, for validating the device information, the validation server 140 may communicate application programming interface (API) requests to the gateway server 130, where each API request may indicate whether a respective parameter 162 (included in the header 108) is valid. In response, the gateway server 140 may compare the received parameter (included in the API request) with the respective parameter in the list of expected parameters 166. For each parameter, If it is determined that the parameter corresponds to the received parameter, the validation server 140 may confirm that the data packet 104 has originated from an authorized device.

In this manner, the disclosed system provides several practical applications, including providing a security measure for transferring data items 106, providing traceability to the data items 106, and increasing the accuracy in validating data items 106 and their origin. Therefore, the disclosed system provides a more secure, accurate, and efficient technique in transmitting and validating data items 106 by adding confidence layers as headers 108, 112 to the data packets 104 along the network path of the data packet 104 through the network 110. Thus, bad actors cannot pass invalid data items 106 as valid by adding a valid hash value to a data item 106.

According, the system and method of the present disclosure saves valuable computer, memory, and networking resources that would otherwise be spent in processing and validating potentially invalid or unauthorized data items 106, which, ultimately enhances overall system efficiency and security. This efficiency is achieved by implementing a structured approach to data validation and secure communication, which, in turn, reduces unnecessary computational load and memory usage in the process of transmitting, processing, and validating data items 106. Additionally, the streamlined validation process minimizes the burden on the network, which, in turn, facilitates smoother and faster data transfer. Furthermore, these resource-saving measures contribute to a more efficient and secure data communication system.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example User Device

The user device 120 may be generally any device that is configured to process data and interact with users 102. Examples of the user device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, or any other suitable type of device. The user device 120*a* may include a user interface, such as a display, a microphone, a camera, keypad, or other appropriate terminal equipment usable by user 102. The user device 120 may include a hardware processor, memory, and/or circuitry configured to perform any of the functions or actions of the user device 120 described herein. For example, the user device 120 includes a processor 122 in signal communication with a network interface 124 and a memory 126. The memory 126 stores software instructions 128 that when executed by the processor 122 cause the processor 122 to perform one or more operations of the user device 120 described herein. The user device 120 is configured to communicate with other devices and components of the system 100 via the network 110. In the present disclosure, the user device 120 may be interchangeably referred to as a computing device.

The user device 120 may be associated with the user 102. The user device 120 may be used to initiate a request to transfer a data item 106. The user device 120 may be configured to append one or more headers 108 to a data packet 104 to transmit the data item 106. The one or more headers 108 may include origin information about the data item 106, user 102, and/or the user device 120. The origin information may interchangeably be referred to the parameters 162. The parameters 162 may include the IP address of the user device 120, an identification of the OS of the user device 120, a timestamp of initiating a request to transfer the data item 106, a device identifier associated with the user device 120, an identifier associated with the user 102, and a user profile associated with the user 102, among others.

Processor 122 comprises one or more processors. The processor 122 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 128) to perform the operations of the gateway server 130 described herein. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-4. For example, the processor 122 may be configured to perform one or more operations of the operational flow 200 as described in FIG. 2, one or more operations of the method 300 as described in FIG. 3, and one or more operations of the method 400 as described in FIG. 4.

Network interface 124 is configured to enable wired and/or wireless communications. The network interface 124 may be configured to communicate data between the user device 120 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

The memory 126 may be a non-transitory computer-readable medium. The memory 126 may be volatile or non-volatile and may comprise read-only memory (ROM), random-access memory (RAM), ternary content-addressable memory (TCAM), dynamic random-access memory (DRAM), and/or static random-access memory (SRAM). The memory 126 may include one or more of a local database, a cloud database, a network-attached storage (NAS), etc. The memory 126 comprises one or more disks, tape drives, or solid-state drives, and may be used as an over-flow data storage device, to store programs when such programs are selected for execution, and to store instructions and data that are read during program execution. The memory 126 may store any of the information described in FIGS. 1-4 along with any other data, instructions, logic, rules, or code operable to implement the function(s) described herein when executed by processor 122. For example, the memory 126 may store software instructions 128, encryption algorithm 164, data packet 104, headers 108, parameters 162, application 168, user profile 170, and/or any other data or instructions. The software instructions 128 may comprise any suitable set of instructions, logic, rules, or code operable to execute the processor 122 and perform the functions described herein, such as some or all of those described in FIGS. 1-4.

The encryption algorithm 164 may be implemented by the processor 122 executing software instructions 128 and is generally configured to encrypt the data packet 104. In some embodiments, the encryption algorithm 164 may include a homomorphic encryption algorithm which allows computations to be performed on encrypted data without decrypting it first. Therefore, the gateway server 130 may be able to identify and validate the content of the headers 108 without the data packet 104 needing to be decrypted first. Similarly, each of the validation server 140 and operation server 150 may be able to identify and validate the content of the headers 108 without the data packet 104 needing to be decrypted first.

The application 168 may be a software, web, or mobile application. The application 168 may be associated with the organization to which the operation server 150 is associated. The application 168 may provide an interface for the user 102 to interact with the application 168 to provide user input to the user device 120. For example, the application 168 may include interfaces to access the user profile 170 where an identification of the data item 106 may be stored. When user 102 wants to initiate a request to transfer the data item 106, the user 102 may access the user profile 170 from the application 168 and indicate they want to transfer the data item 106.

Example Gateway Server

The gateway server 130 generally includes a hardware computer system configured to determine whether the data packet 104 has originated from an authorized device, and if it determined that the data packet 104 has originated from an authorized device, add a header 112 to the data packet 104, and communicate the data packet 104 to the validation server 140.

In certain embodiments, the gateway server 130 may be implemented by a cluster of computing devices, such as virtual machines. For example, the gateway server 130 may be implemented by a plurality of computing devices using distributed computing and/or cloud computing systems in a network. In certain embodiments, the gateway server 130 may be configured to provide services and resources (e.g., headers 112, API responses 174, etc.) to other components and devices. The gateway server 130 comprises a processor 132 operably coupled with a network interface 134 and a memory 136. The memory 136 stores software instructions 138 that when executed by the processor 132 cause the processor 132 to perform one or more operations of the gateway server 130. The gateway server 130 is configured to receive the data packet 104, determine whether the data packet 104 has originated from a validated and authorized device, and in response to determining that the data packet 104 has originated from a validated and authorized device, append a second header 112 to the data packet 104, where the second header indicates that the data packet 104 has originated from a validated and authorized device.

Processor 132 comprises one or more processors. The processor 132 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 132 may be a programmable logic device, a microcontroller, a microprocessor, or any suitable number and combination of the preceding. The one or more processors are configured to process data and may be implemented in hardware or software. For example, the processor 132 may be 8-bit, 16-bit, 32-bit, 64-bit, or of any other suitable architecture. The processor 132 may include an ALU for performing arithmetic and logic operations. The processor 132 may register the supply operands to the ALU and store the results of ALU operations. The processor 132 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 138) to perform the operations of the gateway server 130 described herein. In this way, processor 132 may be a special-purpose computer designed to implement the functions disclosed herein. In an embodiment, the processor 132 is implemented using logic units, FPGAs, ASICs, DSPs, or any other suitable hardware. The processor 132 is configured to operate as described in FIGS. 1-4. For example, the processor 132 may be configured to perform one or more operations of the operational flow 200 as described in FIG. 2, one or more operations of the method 300 as described in FIG. 3, and one or more operations of the method 400 as described in FIG. 4.

Network interface 134 is configured to enable wired and/or wireless communications. The network interface 134 may be configured to communicate data between the gateway server 130 and other devices, systems, or domains. For example, the network interface 134 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 132 may be configured to send and receive data using the network interface 134. The network interface 134 may be configured to use any suitable type of communication protocol.

The memory 136 may be a non-transitory computer-readable medium. The memory 136 may be volatile or non-volatile and may comprise ROM, RAM, TCAM, DRAM, and/or SRAM. The memory 136 may include one or more of a local database, a cloud database, a NAS, etc. The memory 136 comprises one or more disks, tape drives, or solid-state drives, and may be used as an over-flow data storage device, to store programs when such programs are selected for execution, and to store instructions and data that are read during program execution. The memory 136 may store any of the information described in FIGS. 1-4 along with any other data, instructions, logic, rules, or code operable to implement the function(s) described herein when executed by processor 132. For example, the memory 136 may store software instructions 138, list of expected parameters 166, headers 112, threshold number 176, countermeasure actions 178, request message 210, and/or any other data or instructions. The software instructions 138 may comprise any suitable set of instructions, logic, rules, or code operable to execute the processor 132 and perform the functions described herein, such as some or all of those described in FIGS. 1-4.

Example Validation Server

The validation server 140 generally includes a hardware computer system configured to validate user information and device information included in the headers 108 and validate the confidence signature of the gateway server 130 included in the headers 112, and if it is determined that the user information, device information, and confidence signature are valid, communicate the data packet 104 to the operation server 150 for processing.

In certain embodiments, the validation server 140 may be implemented by a cluster of computing devices, such as virtual machines. For example, the validation server 140 may be implemented by a plurality of computing devices using distributed computing and/or cloud computing systems in a network. In certain embodiments, the validation server 140 may be configured to provide services and resources (e.g., API requests 172, etc.) to other components and devices. The validation server 140 comprises a processor 142 operably coupled with a network interface 144 and a memory 146. The memory 146 stores software instructions 148 that when executed by the processor 142 cause the processor 142 to perform one or more operations of the validation server 140.

Processor 142 comprises one or more processors. The processor 142 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 142 may be a programmable logic device, a microcontroller, a microprocessor, or any suitable number and combination of the preceding. The one or more processors are configured to process data and may be implemented in hardware or software. For example, the processor 142 may be 8-bit, 16-bit, 32-bit, 64-bit, or of any other suitable architecture. The processor 142 may include an ALU for performing arithmetic and logic operations. The processor 142 may register the supply operands to the ALU and store the results of ALU operations. The processor 142 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 148) to perform the operations of the validation server 140 described herein. In this way, processor 142 may be a special-purpose computer designed to implement the functions disclosed herein. In an embodiment, the processor 142 is implemented using logic units, FPGAs, ASICs, DSPs, or any other suitable hardware. The processor 142 is configured to operate as described in FIGS. 1-4. For example, the processor 142 may be configured to perform one or more operations of the operational flow 200 as described in FIG. 2, one or more operations of the method 300 as described in FIG. 3, and one or more operations of the method 400 as described in FIG. 4.

Network interface 144 is configured to enable wired and/or wireless communications. The network interface 144 may be configured to communicate data between the validation server 140 and other devices, systems, or domains. For example, the network interface 144 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 142 may be configured to send and receive data using the network interface 144. The network interface 144 may be configured to use any suitable type of communication protocol.

The memory 146 may be a non-transitory computer-readable medium. The memory 146 may be volatile or non-volatile and may comprise ROM, RAM, TCAM, DRAM, and/or SRAM. The memory 146 may include one or more of a local database, a cloud database, a NAS, etc. The memory 146 comprises one or more disks, tape drives, or solid-state drives, and may be used as an over-flow data storage device, to store programs when such programs are selected for execution, and to store instructions and data that are read during program execution. The memory 146 may store any of the information described in FIGS. 1-4 along with any other data, instructions, logic, rules, or code operable to implement the function(s) described herein when executed by processor 142. For example, the memory 146 may store software instructions 148, countermeasure actions 178, request message 214, and/or any other data or instructions. The software instructions 148 may comprise any suitable set of instructions, logic, rules, or code operable to execute the processor 142 and perform the functions described herein, such as some or all of those described in FIGS. 1-4.

Example Operation Server

The operation server 150 generally includes a hardware computer system configured to execute instructions to perform an operation on the data item 106. For example, the operation server 150 may communicate the data item 106 to one or more operation processing servers to perform the operation on the data item 106. In another example, the operation server 150 may perform the operation on the data item 106. The operation may be transferring the data item 106 to a prescribed receiver device or a prescribed receiver user profile. The operation server 150 may be associated with an organization that provide services and/or products to its users 102, such as maintaining and/or transferring data items 106 among users 102, organizations, etc.

In certain embodiments, the operation server 150 may be implemented by a cluster of computing devices, such as virtual machines. For example, the operation server 150 may be implemented by a plurality of computing devices using distributed computing and/or cloud computing systems in a network. In certain embodiments, the operation server 150 may be configured to provide services and resources (e.g., user profiles 170, etc.) to other components and devices. The operation server 150 comprises a processor 152 operably coupled with a network interface 154 and a memory 156. The memory 156 stores software instructions 158 that when executed by the processor 152 cause the processor 152 to perform one or more operations of the operation server 150.

Processor 152 comprises one or more processors. The processor 152 is any electronic circuitry, including, but not limited to, state machines, one or more CPU chips, logic units, cores (e.g., a multi-core processor), FPGAs, ASICs, or DSPs. For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture. The processor 152 may include an ALU for performing arithmetic and logic operations. The processor 152 may register the supply operands to the ALU and store the results of ALU operations. The processor 152 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 158) to perform the operations of the operation server 150 described herein. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-4. For example, the processor 152 may be configured to perform one or more operations of the operational flow 200 as described in FIG. 2, one or more operations of the method 300 as described in FIG. 3, and one or more operations of the method 400 as described in FIG. 4.

Network interface 154 is configured to enable wired and/or wireless communications. The network interface 154 may be configured to communicate data between the operation server 150 and other devices, systems, or domains. For example, the network interface 154 may comprise an NFC interface, a Bluetooth interface, a Zigbee interface, a Z-wave interface, a RFID interface, a WIFI interface, a LAN interface, a WAN interface, a MAN interface, a PAN interface, a WPAN interface, a modem, a switch, and/or a router. The processor 152 may be configured to send and receive data using the network interface 154. The network interface 154 may be configured to use any suitable type of communication protocol.

The memory 156 may be a non-transitory computer-readable medium. The memory 156 may be volatile or non-volatile and may comprise ROM, RAM, TCAM, DRAM, and/or SRAM. The memory 156 may include one or more of a local database, a cloud database, a NAS, etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-4 along with any other data, instructions, logic, rules, or code operable to implement the function(s) described herein when executed by processor 152. For example, the memory 156 may store software instructions 158, user profiles 170, and/or any other data or instructions. The software instructions 158 may comprise any suitable set of instructions, logic, rules, or code operable to execute the processor 152 and perform the functions described herein, such as some or all of those described in FIGS. 1-4.

Figure 2:
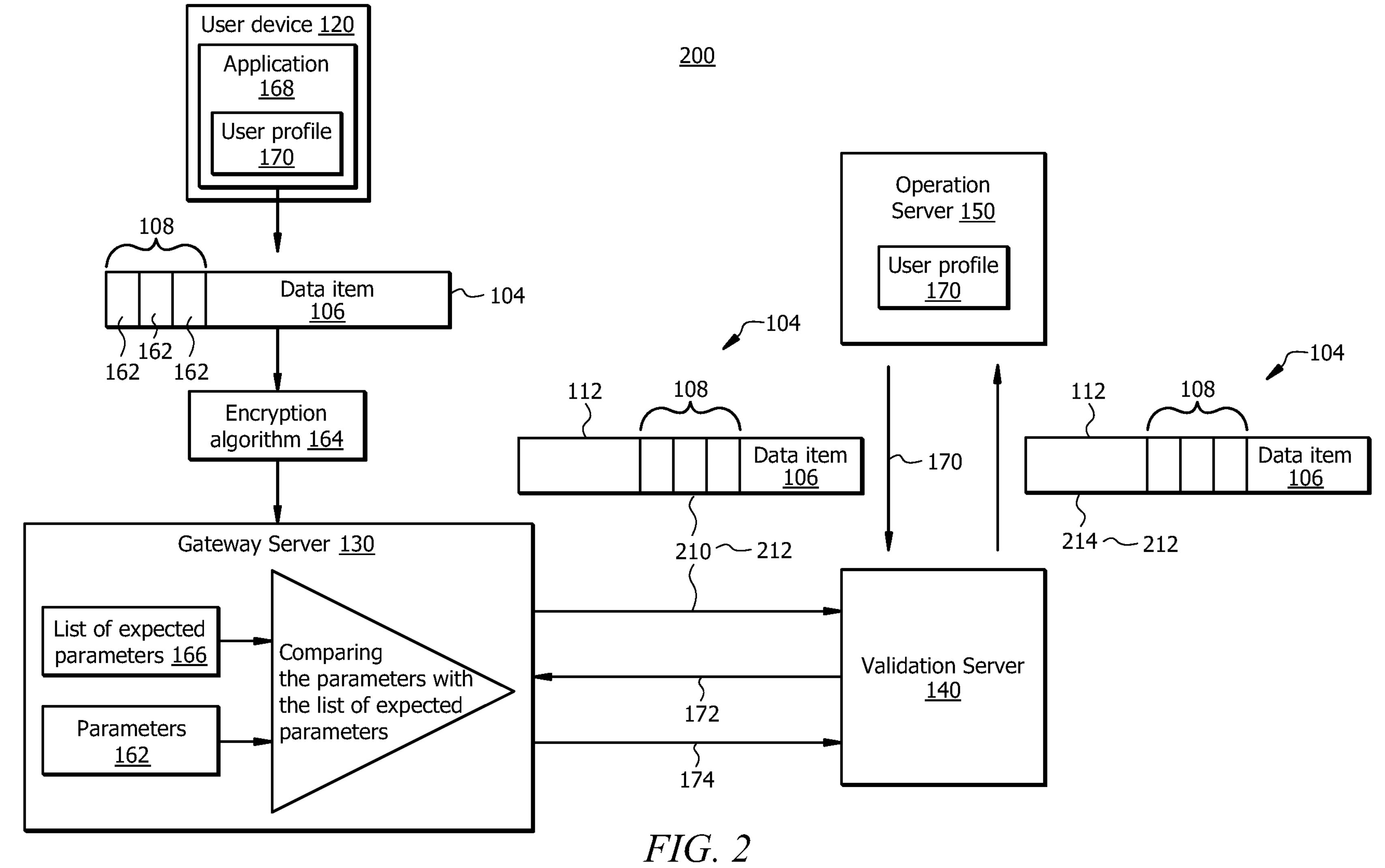
FIG. 2 illustrates an example operational flow of the system of FIG. 1.

Example Operational Flow for Implementing Traceability to a Data Item and Validating Origin Information of the Data Item FIG. 2 illustrates an example operational flow 200 of the system 100 (see FIG. 1) for implementing traceability to a data item 106 and validating origin information of a data item 106, according to some embodiments of the present disclosure. In example operation of system 100, the operational flow 200 may begin when the user 102 provides user input to the user device 120, where the user input indicates that the user 102 wants to transfer a data item 106. To this end, the user 102 may access the user profile 1170 where the data items 106 are stored via the application 168 and indicate that they want to transfer one or more data items 106. In some examples, the user profile 170 may be or include a digital wallet and the data item 106 may be or include cryptocurrency.

In response to receiving the user request to transfer the data item 106, the user device 120 may generate a data packet 104 to encapsulate one or more of the user requests, an identifier of the data item 106, the data item 106, among other information about the data item 106, such as the amount of the data item 106.

Appending One or More Headers to the Data Packet

The user device 120 may include origin information associated with the user 102, the user device 120, and/or the data item 106 to the data packet 104 as headers 108. The origin information may be represented by the parameters 162, similar to that described in FIG. 1. In this process, the user device 120 may access device information associated with the user device 120, including location information (global positioning system (GPS) location coordinates), IP address, OS, an identifier of the user device 120 (e.g., serial number) and other identifiers of the user device 120. The user device 120 may save this information as one or more respective parameters 162.

Further in this process, the user device 120 may access information about the user request, including the timestamp of initiating the request to transfer the data item 106, the amount of the data item 106 requested to be transferred, the size of the data item 106, the identifier of the data item 106, and the like. the user device 120 may save this information as one or more respective parameters 162. The user device 120 may append the data packet 104 with one or more headers 108, where the one or more headers 108 may include the one or more parameters 162.

In some embodiments, the one or more parameters 162 may be indicated and included in a single header 108. In some embodiments, the one or more parameters 162 may be indicated and included in a respective (and separate) header 108. In some embodiments, the number of headers 108 may be linearly proportional to the number of parameters 162. For example, each header 108 may contain a single parameter 162. In some embodiments, each header 108 may contain one or more parameters 162. For example, each header 108 may include a flag bit data, code, and the like. In this manner, the user device 120 may add origin information to the data packet 104 and data item 106 which adds traceability to the data packet 104 and data item 106.

Therefore, the security and legitimacy of the data packet 104 and data item 106 is increased. For example, when a user wants to transfer the data item 106 to another user or organization, if the data item 106 is not accompanied by its respective origin information and/or the origin information is not linked to the data item 106 is determined to be invalid, it may be determined that the data item 106 was obtained without authorization. In response, certain countermeasure actions 178 may be performed to address the unauthorizedly obtained data item 106. For example, the data item 106 may be confiscated. In another example, the data item 106 may be communicated to authorized parties to investigate the issue. In some embodiments, the countermeasure actions 178 may be performed by one or more of the gateway server 130 and/or validation server 140. In this manner, the system 100 adds security measures to improve the security and verification process of the data items 106.

In some embodiments, the user device 120 may encrypt the data packet 104 by feeding the data packet 104 to the encryption algorithm 164. The encryption algorithm 164 may encrypt the data packet 104 into an encrypted data packet 104.

Appending a Confidence Layer to the Data Item

The user device 120 communicates the data packet 104 to the gateway server 130. The gateway server 130 may verify the data packet 104. In other words, the gateway server 130 may determine whether the data packet 104 is received from an authorized device based on the device information included in the headers 108.

In this process, the gateway server 130 may identify the device information included in the headers 108. For example, the gateway server 130 may identify the IP address, OS identifier, location information, and the identifier of the user device 120 included as some of parameters 162 in the headers 108. The gateway server 130 may then access the list of expected parameters 166 from its memory. The gateway server 130 may compare each parameter 162 with a counterpart parameter 166 from the list of expected parameters 166. For example, the gateway server 130 may compare the IP address parameter 162 indicated in a header 108 with the list of expected IP address parameters 166 indicated in the list of expected parameters 166. If it is determined that the IP address parameter 162 is among the expected IP addresses in the list of expected IP address parameters 166, the gateway server 130 may determine that the IP address of the user device 120 is among the authorized IP addresses.

In another example, the gateway server 130 may compare the OS identifier parameter 162 indicated in a header 108 with the list of expected OS identifier parameters 166 indicated in the list of expected parameters 166. If it is determined that the OS identifier parameter 162 is among the expected OS identifiers in the list of expected OS parameters 166, the gateway server 130 may determine that the OS of the user device 120 is among the authorized OSs.

In another example, the gateway server 130 may compare the location information parameter 162 indicated in a header 108 with the list of expected location information parameters 166 indicated in the list of expected parameters 166. If it is determined that the location information parameter 162 is among the expected location information in the list of expected location information parameters 166, the gateway server 130 may determine that the location information of the user device 120 is among the authorized locations.

In another example, the gateway server 130 may compare the identifier parameter 162 indicated in a header 108 with the list of expected identifier parameters 166 indicated in the list of expected parameters 166. If it is determined that the identifier parameter 162 is among the expected identifier in the list of expected identifier parameters 166, the gateway server 130 may determine that the identifier of the user device 120 is among the authorized identifiers.

If the gateway server 130 determines that more than a threshold number 176 of parameters 162 corresponds to a counterpart parameter 166 from among the list of expected parameters 166, the gateway server 130 may determine that the data packet 104 has originated from an authorized device. Otherwise, the gateway server 130 may determine that the data packet 104 has originated from an unauthorized device. In some embodiments, determining that more than the threshold number 176 of the parameters 162 corresponds to the counterpart parameters 166 from among the list of expected parameters 166 comprises determining that each parameter 162 corresponds to a counterpart parameter 166 from among the list of expected parameters 166. In some examples, the threshold number 176 of parameters 162 may be one, two, five, ten, etc.

If it is determined that the data packet 104 has originated from an authorized device, the gateway server 130 may add a confidence signature to the data packet 104. For example, the gateway server 130 may append a header 112 to the data packet 104, where the header 112 indicates that the data packet 104 is verified and has originated from an authorized device. For example, the header 112 may include a flag bit data, code, and the like.

In response, in some embodiments, the gateway server 130 may communicate the data packet 104 to the validation server 140. In some embodiments, the gateway server 130 may communicate a request message 210 that comprises the data packet 104 appended with the headers 112 and 018 and instructions 212. In some embodiments, the instructions 212, when executed, may cause the data packet 104 to be transferred, for example, to a prescribed receiver or node entity, such as an operation processing server that is configured to process the data item 106 and transfer it to a prescribed user profile.

In some embodiments, one or more gateway servers 130 may be along the network path of the data packet 104. Therefore, each of the one or more gateway servers 130 may add one or more headers 112 may be added to the data packet 104. This increases the security in the communication of the data packet 104 in the network. Therefore, the system 100 facilitates that data packet 104 is not intercepted or altered at any point along its network path.

Validating User Information Appended to the Data Item

If the gateway server 130 determines that the data packet 104 is valid and has originated from an authorized device, the gateway server 130 may communicate the data packet 104 to the validation server 140. The validation server 140 may verify the user information and device information included as some of the parameters 162 in the headers 108. In this process, to validate the user information, the validation server 140 may request the operation server 150 to send the user profile 170 associated with the user 102 whose identifier is indicated in the header 108.

In response, the operation server 150 may communicate the user profile 170 to the validation server 140. The user profile 170 may include previously provided user information provided by the user 102 to the organization associated with the operation server 150. For example, the user profile 170 may include the identifier associated with the user 102, name of the user, address of the user, etc. The validation server 140 may identify the user information included in the headers 108, including the identifier of the user 102, the name, address, etc.

The validation server 140 may compare the user information included in the headers 108 with previously provided user information identified from the user profile 170. If each user information included in the headers 108 corresponds with the counterpart user information identified from the user profile 170, the validation server 140 may determine that the user information included in the headers 108 is valid and that the user 102 is verified.

To verify the device information, the validation server 140 may communicate API request(s) 172 to the gateway server 130. Each API request 172 may indicate whether respective information about the user device 120 that is included in headers 108 is valid. For example, a first API request 172 may indicate whether the IP address of the user device 120 is valid, a second API request 172 may indicate whether the OS of the user device 120 is valid, a third API request 172 may indicate whether the identifier of the user device 120 is valid, and a fourth API request 172 may indicate whether the location information associated with the user device 120 is valid. In some embodiments, a single API request 172 may indicate whether all information about the user device 120 that is included in the header 108 is valid.

The gateway server 130 may compare each user device information included in the API requests 172 with the counterpart parameter 166 in the list of expected parameters 166. If the gateway server 130 determines that a user device information from the API request 172 corresponds to the counterpart parameter 166, the gateway server 130 may communicate an API response 174 that indicates the respective user device information is valid. If the gateway server 130 determines that a user device information from the API request 172 does not correspond to the counterpart parameter 166, the gateway server 130 may communicate an API response 174 that indicates the respective user device information is invalid. In this manner, the validation server 140 may confirm the validity of user device information.

In some embodiments, the validation server 140 may further determine whether the header 112 is added to the data packet 104 by the gateway server 130. For example, the validation server 140 may communicate an API request 172 to the gateway server 130, where the API request 172 indicates whether the header 112 is added to the data packet 104 by the gateway server 130. The gateway server 130 compares the received information about the header 108 with the original header 108. If it is determined that the received information about the header 108 corresponds to the original header 108, the gateway server 130 communicates an API response 174 that indicates the header 112 is valid to the validation server 140. Otherwise, the gateway server 130 may communicate an API response 174 that indicates the header 112 is invalid to the validation server 140.

In response to receiving API responses 174 that indicate the user information and user device information included in the headers 108 are valid and the header 112 is valid, the validation server 140 may communicate a request message 214 to the operation server 150, where the request message 214 may include the data packet 104 and the instructions 212. The operation server 150 may receive the request message 214 and in response, execute the instructions 212 included in the request message 214.

Example Method for Implementing Traceability to a Data Item

Figure 3:
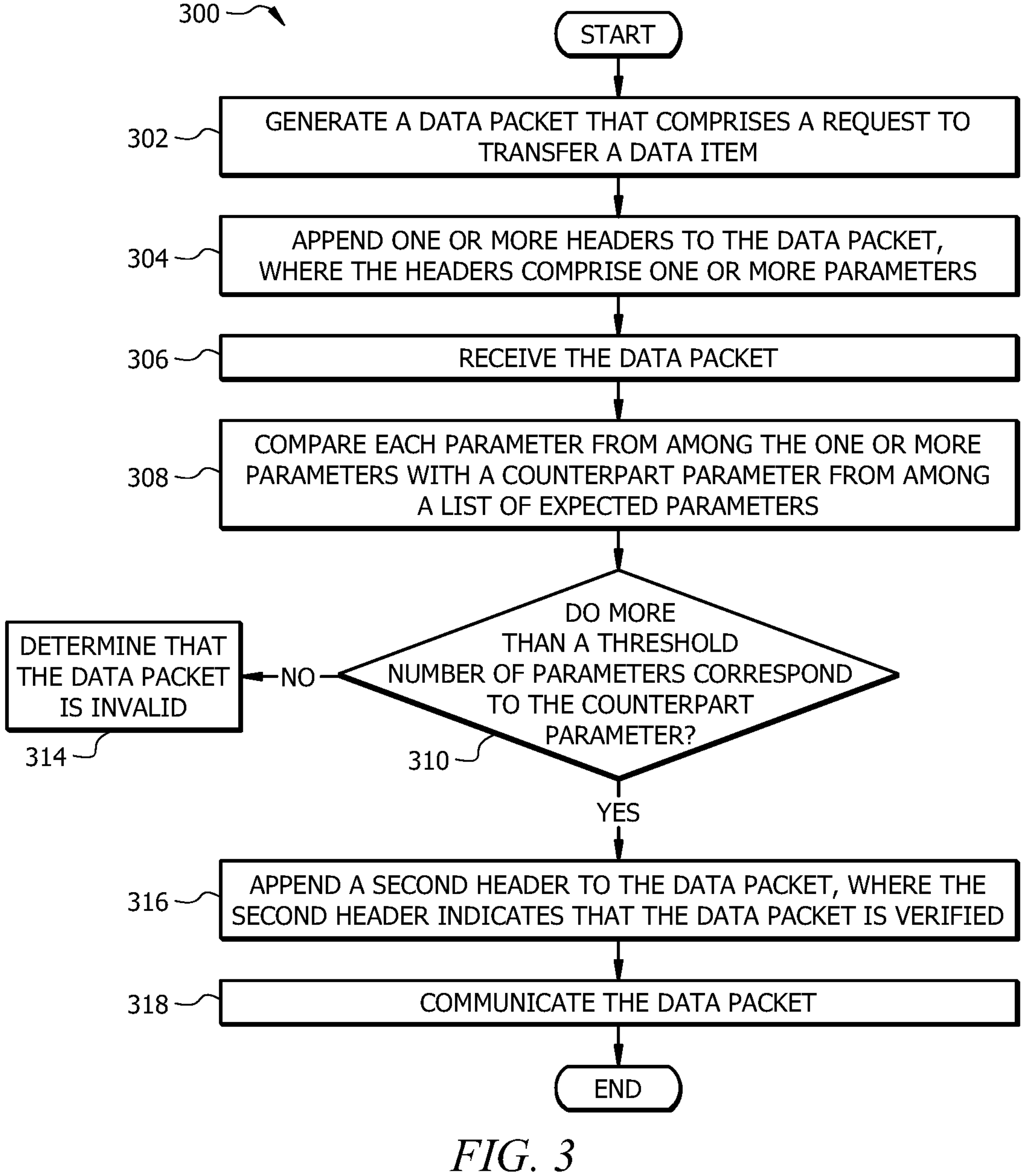
FIG. 3 illustrates an example flowchart of a method to implement traceability to a data item.

FIG. 3 illustrates an example flowchart of a method 300 for implementing traceability to a data item 106 according to some embodiments of the present disclosure. Modifications, additions, or omissions may be made to method 300. Method 300 may include more, fewer, or other operations. For example, operations may be performed in parallel or in any suitable order. While at times, it is discussed that the system 100, user device 120, gateway server 130, validation server 140, operation server 150, or components of any of thereof perform certain operations, any suitable system or components may perform one or more operations of the method 300. For example, one or more operations of method 300 may be implemented, at least in part, in the form of software instructions 128, 138, 148, and 158, of FIG. 1, stored on a tangible non-transitory computer-readable medium (e.g., memory 126, 136, 146, 156 of FIG. 1) that when run by one or more processors (e.g., processors 122, 132, 142, 152 of FIG. 1) may cause the one or more processors to perform operations 302-318.

At operation 302, the user device 120 generates a data packet 104 that comprises a request to transfer a data item 106. For example, the user device 120 may generate the data packet 104 in response to receiving the request from the user 102, similar to that described in FIG. 2.

At operation 304, the user device 120 appends one or more headers 108 to the data packet 104, where the one or more headers 108 comprise one or more parameters 162. For example, the user device 120 may append the headers 108 to the data packet 104 using any data structure formation algorithm or program. The user device 120 may communicate the data packet 104 to the gateway server 130.

At operation 306, the gateway server 130 receives the data packet 104. At operation 308, the gateway server 130 compares each parameter 162 from among the one or more parameters 162 with a counterpart parameter from among the list of expected parameters 162, similar to that described in FIG. 2.

At operation 310, the gateway server 130 determines whether more than a threshold number 176 of parameters 162 corresponds to the counterpart parameter 166. If it is determined that more than the threshold number 176 of parameters 162 corresponds to the counterpart parameter 166, the method 300 proceeds to operation 316. Otherwise, the method 300 proceeds to operation 314.

At operation 314, the gateway server 130 determines that the data packet 104 is invalid. In response, the gateway server 130 may perform countermeasure actions 178 to address the invalid data packet 104. For example, the gateway server 130 may confiscate the data packet 104 and communicate the data packet 104 to an authorized party to investigate the origin of the data packet 104.

At operation 316, the gateway server 130 appends a second header 112 to the data packet 104, where the second header 112 indicates that the data packet 104 is verified. For example, the gateway server 130 may append the header 112 to the data packet 104 using any data structure formation algorithm or program. At operation 318, the gateway server 130 communicates the data packet 104, for example, to the validation server 140.

Example Method for Validating Origin Information of a Data Item

Figure 4:
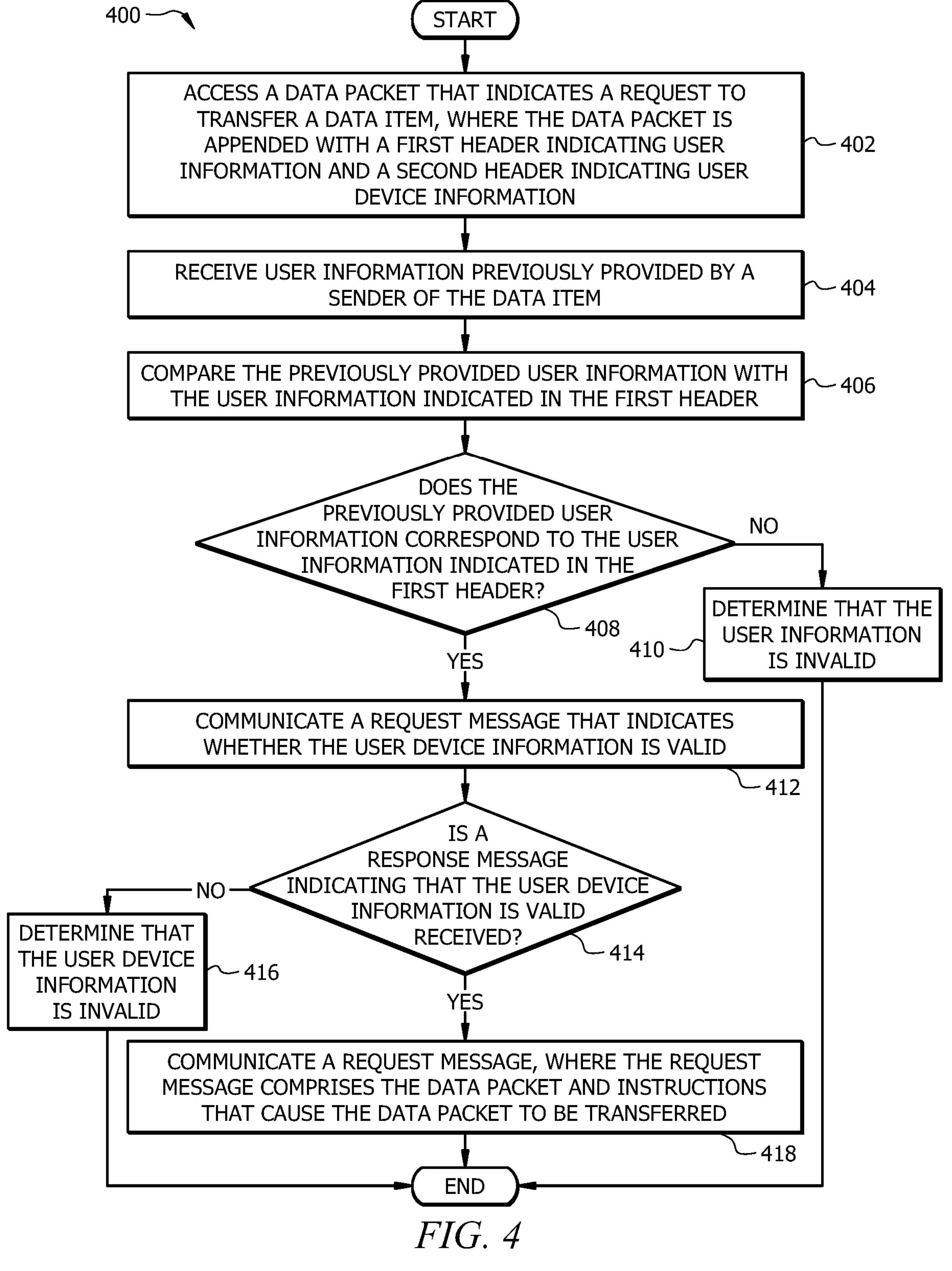
FIG. 4 illustrates an example flowchart of a method to validate the origin information of a data item.

FIG. 4 illustrates an example flowchart of a method 400 for validating the origin information of a data item 106 according to some embodiments of the present disclosure. Modifications, additions, or omissions may be made to method 400. Method 400 may include more, fewer, or other operations. For example, operations may be performed in parallel or in any suitable order. While at times, it is discussed that the system 100, user device 120, gateway server 130, validation server 140, operation server 150, or components of any of thereof perform certain operations, any suitable system or components may perform one or more operations of the method 400. For example, one or more operations of method 300 may be implemented, at least in part, in the form of software instructions 128, 138, 148, and 158, of FIG. 1, stored on a tangible non-transitory computer-readable medium (e.g., memory 126, 136, 146, 156 of FIG. 1) that when run by one or more processors (e.g., processors 122, 132, 142, 152 of FIG. 1) may cause the one or more processors to perform operations 402-418. In some embodiments, the method 400 may be a continuation of the method 500.

At operation 402, the verification server 140 accesses a data packet 104 that indicates a request to transfer a data item 106, where the data packet 104 (or data item 106) is appended with a first header 108 indicating user information and a second header 108 indicating user device information. For example, the user information and user device information may be represented by one or more parameters 162, similar to that described in FIG. 2.

At operation 404, the verification server 140 receives user information previously provided by the sender (i.e., user 102) of the data packet 104. For example, the verification server 140 may receive the user profile 170 that includes the user information from the operation server 150, similar to that described in FIG. 2.

At operation 406, the verification server 140 compares the previously provided user information with the user information indicated in the first header 108. At operation 408, the verification server 140 determines whether the previously provided user information corresponds to the user information indicated in the first header 108. If it is determined that the previously provided user information corresponds to the user information indicated in the first header 108, the method 400 proceeds to operation 412. Otherwise, the method 400 proceeds to operation 410.

At operation 410, the verification server 140 determines that the user information associated with the user 102 is invalid. In response, the verification server 140 may perform countermeasure actions 178 to address the invalid user information and ultimately the invalid data packet 104.

At operation 412, the verification server 140 communicates a request message (e.g., API request 172) that indicates whether the user device information is valid. For example, the verification server 140 may communicate the API request 172 to the gateway server 130, similar to that described in FIG. 2.

At operation 414, the verification server 140 determines whether a response message (e.g., API response 174) indicting that the use device information is valid received. If it is determined that the API response 174 indicting that the use device information is valid received, the method 400 may proceed to operation 418. In response, the verification server 140 determines that the user 102 is authorized to transfer the data item 106. Otherwise, the method 400 may proceed to operation 416.

At operation 416, the verification server 140 determines that the user device information is invalid. At operation 418, the verification server 140 communicates a request message 214, where the request message 214 comprises the data packet 104 and instructions 212 that cause the data packet to be transferred.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for validating origin information of a data item, comprising:
- a validation server comprising:
  - a memory configured to store user information associated with a sender of a data item; and
  - a first processor, operably coupled to the memory and configured to:
    - access a data packet that indicates a request to transfer the data item, wherein:
      - the data packet is appended with at least a first header and a second header;
      - the first header comprises information about the sender of the data packet; and
      - the second header comprises a plurality of parameters comprising information about a user device from which the data packet has originated;
    - receive the user information that is previously provided by the sender of the data item;
    - compare the user information with the information about the sender of the data packet;
    - determine that the user information corresponds to the information about the sender of the data packet;
    - communicate a first request message to a gateway server to determine whether the information about the user device is valid;
- the gateway server comprising a second processor configured to:
  - compare each parameter from the plurality of parameters with a counterpart expected parameter;
  - determine that more than a threshold number of parameters from the plurality of parameters correspond to counterpart expected parameters;
  - in response to determining that more than the threshold number of parameters correspond to the counterpart expected parameters, append a third header to the data packet, that indicates that the data packet has originated from an authorized device;
- wherein the first processor is further configured to:
  - receive a first response message from the gateway server, wherein:
    - the first response message indicates that the information about the user device is valid; and
    - a receipt of the first response message is in response to:
      - a comparison between each parameter from the plurality of parameters with the counterpart expected parameter; and
      - a determination that more than the threshold number of parameters from the plurality of parameters correspond to counterpart expected parameters;
  - in response to receiving the first response message and determining that the user information corresponds to the information about the sender of the data packet, communicate a second request message to an operation server, wherein:
    - the second request message comprises the data packet; and
    - the second request message further comprises instructions that cause the data packet to be transferred.

2. The system of claim 1, wherein a determination that the information about the user device is valid is in response to:

comparing the information about the user device with previously provided information about the user device; and determining that the information about the user device corresponds to the previously provided information about the user device.

3. The system of claim 2, wherein the previously provided information about the user device comprises at least one of an internet protocol (IP) address, an identifier, or an identification of an operating system (OS) associated with the user device.

4. The system of claim 1, further comprising the operation server communicatively coupled to the first processor and the gateway server, the operation server comprising a third processor configured to:

receive the second request message; and execute the instructions included in the second request message.

5. The system of claim 1, wherein the information about the sender of the data packet included in the first header comprises at least one of an identifier associated with the sender or a timestamp of originating the request.

6. The system of claim 1, wherein:

to compare each parameter from the plurality of parameters with the counterpart expected parameter, the second processor is configured to compare location information associated with the user device with a list of expected location information; and to determine that more than the threshold number of parameters correspond to the counterpart expected parameters, the second processor is configured to determine that the location information is among the list of expected location information.

7. The system of claim 1, wherein:

to compare each parameter from the plurality of parameters with the counterpart expected parameter, the second processor is configured to compare an operating system (OS) identifier associated with the user device with a list of expected OS identifiers; and to determine that more than the threshold number of parameters correspond to the counterpart expected parameters, the second processor is configured to determine that the OS identifier is among the list of expected OS identifiers.

8. A method for validating origin information of a data item, comprising:

storing user information associated with a sender of a data item;

accessing, by a first processor of a validation server, a data packet that indicates a request to transfer the data item, wherein:

the data packet is appended with at least a first header and a second header;

the first header comprises information about the sender of the data packet; and the second header comprises a plurality of parameters comprising information about a user device from which the data packet has originated;

receiving, by the first processor, the user information that is previously provided by the sender of the data item;

comparing, by the first processor, the user information with the information about the sender of the data packet;

determining, by the first processor, that the user information corresponds to the information about the sender of the data packet;

communicating, by the first processor, a first request message to a gateway server to determine whether the information about the user device is valid;

comparing, by a second processor of the gateway server, each parameter from the plurality of parameters with a counterpart expected parameter;

determining, by the second processor, that more than a threshold number of parameters from the plurality of parameters correspond to counterpart expected parameters;

in response to determining that more than the threshold number of parameters correspond to the counterpart expected parameters, appending, by the second processor, a third header to the data packet, that indicates that the data packet has originated from an authorized device;

receiving, by the first processor, a first response message from the gateway server, wherein:

the first request message indicates that the information about the user device is valid; and a receipt of the first response message is in response to:

a comparison between each parameter from the plurality of parameters with a counterpart expected parameter; and a determination that more than a threshold number of parameters from the plurality of parameters correspond to counterpart expected parameters;

in response to receiving the first response message and determining that the user information corresponds to the information about the sender of the data packet, communicating, by the first processor, a second request message to an operation server, wherein:

the second request message comprises the data packet; and the second request message further comprises instructions that cause the data packet to be transferred.

9. The method of claim 8, wherein a determination that the information about the user device is valid is in response to:

comparing the information about the user device with previously provided information about the user device; and determining that the information about the user device corresponds to the previously provided information about the user device.

10. The method of claim 9, wherein the previously provided information about the user device comprises at least one of an internet protocol (IP) address, an identifier, or an identification of an operating system (OS) associated with the user device.

11. The method of claim 8, further comprising:

receiving, by an operation sever, the second request message; and executing, by the operation server, the instructions included in the second request message.

12. The method of claim 8, wherein the information about the sender of the data packet included in the first header comprises at least one of an identifier associated with the sender or a timestamp of originating the request.

13. The method of claim 8, wherein the information about the user device included in the second header comprises at least one of an internet protocol (IP) address, an identifier, or an identification of an operating system (OS) associated with the user device.

14. The method of claim 8, wherein:

the first request message comprises an application programming interface (API) request; and the first response message comprises an API response.

15. A non-transitory computer-readable medium storing instructions that when executed by one or more processors, cause the processor to:

store user information associated with a sender of a data item;

access, by a first processor of a validation server, a data packet that indicates a request to transfer the data item, wherein:

the data packet is appended with at least a first header and a second header;

the first header comprises information about the sender of the data packet; and the second header comprises a plurality of parameters comprising information about a user device from which the data packet has originated;

receive, by the first processor, the user information that is previously provided by the sender of the data item;

compare, by the first processor, the user information with the information about the sender of the data packet;

determine, by the first processor, that the user information corresponds to the information about the sender of the data packet;

communicate, by the first processor, a first request message to a gateway server to determine whether the information about the user device is valid;

compare, by a second processor of the gateway server, each parameter from the plurality of parameters with a counterpart expected parameter;

determine, by the second processor, that more than a threshold number of parameters from the plurality of parameters correspond to counterpart expected parameters;

in response to determining that more than the threshold number of parameters correspond to the counterpart expected parameters, append, by the second processor, a third header to the data packet, that indicates that the data packet has originated from an authorized device;

receive, by the first processor, a first response message from the gateway server, wherein:

the first request message indicates that the information about the user device is valid; and a receipt of the first response message is in response to:

a comparison between each parameter from the plurality of parameters with a counterpart expected parameter; and a determination that more than a threshold number of parameters from the plurality of parameters correspond to counterpart expected parameters;

in response to receiving the first response message and determining that the user information corresponds to the information about the sender of the data packet, communicate, by the first processor, a second request message to an operation server, wherein:

the second request message comprises the data packet; and the second request message further comprises instructions that cause the data packet to be transferred.

16. The non-transitory computer-readable medium of claim 15, wherein a determination that the information about the user device is valid is in response to:

comparing the information about the user device with previously provided information about the user device; and determining that the information about the user device corresponds to the previously provided information about the user device.

17. The non-transitory computer-readable medium of claim 16, wherein the previously provided information about the user device comprises at least one of an internet protocol (IP) address, an identifier, or an identification of an operating system (OS) associated with the user device.

18. The non-transitory computer-readable medium of claim 15, wherein the information about the sender of the data packet included in the first header comprises at least one of an identifier associated with the sender or a timestamp of originating the request.

19. The non-transitory computer-readable medium of claim 15, wherein the information about the user device included in the second header comprises at least one of an internet protocol (IP) address, an identifier, or an identification of an operating system (OS) associated with the user device.

20. The non-transitory computer-readable medium of claim 15, wherein:

the first request message comprises an application programming interface (API) request; and the first response message comprises an API response.

* * * * *